United States Patent
Drako et al.

(10) Patent No.: US 10,848,808 B2
(45) Date of Patent: Nov. 24, 2020

(54) APPARATUS FOR SHARING PRIVATE VIDEO STREAMS WITH PUBLIC SERVICE AGENCIES

(71) Applicant: EAGLE EYE NETWORKS, INC., West Lake Hills, TX (US)

(72) Inventors: Dean Drako, Austin, TX (US); Steven Roskowski, Los Gatos, CA (US); Timothy Duncan, Round Rock, TX (US)

(73) Assignee: Eagle Eye Networks, Inc., Austin, TX (US)

( * ) Notice: Subject to any disclaimer, the term of this patent is extended or adjusted under 35 U.S.C. 154(b) by 0 days.

(21) Appl. No.: 16/550,263

(22) Filed: Aug. 25, 2019

(65) Prior Publication Data
US 2020/0014964 A1 Jan. 9, 2020

Related U.S. Application Data

(63) Continuation-in-part of application No. 15/253,871, filed on Sep. 1, 2016, now Pat. No. 10,505,923.
(Continued)

(51) Int. Cl.
| | |
|---|---|
| *H04N 7/18* | (2006.01) |
| *H04N 21/258* | (2011.01) |
| *H04W 12/06* | (2009.01) |
| *H04W 12/08* | (2009.01) |
| *H04N 21/6587* | (2011.01) |

(Continued)

(52) U.S. Cl.
CPC ... *H04N 21/25816* (2013.01); *H04N 21/2393* (2013.01); *H04N 21/41407* (2013.01); *H04N 21/4223* (2013.01); *H04N 21/6587* (2013.01); *H04W 12/0608* (2019.01); *H04W 12/08* (2013.01)

(58) Field of Classification Search
CPC ................................................ H04N 21/25816
USPC ....................................................... 348/158
See application file for complete search history.

(56) References Cited

U.S. PATENT DOCUMENTS 7,114,128 B2 * 9/2006 Koppolu ............... G06F 16/748
715/781
8,300,098 B1 * 10/2012 Gruttadauria ............ H04N 5/76
348/143

(Continued)

*Primary Examiner* — Leron Beck
(74) *Attorney, Agent, or Firm* — Patentry; Peter G. H. Hwang

(57) ABSTRACT

A video surveillance service shares image streams with public service agencies in the event of emergency. Nominated agencies establish access credentials at the surveillance service data center. A video stream is shared by a customer administrator's selection of permissions on each camera via privileged web-browser. Permissions enable selection by static meta data such as type, audio, location, motion, and epoch. Video streams of present and past epochs are controlled by time. A public service agency receives an electronic notification from the administrator to present their access credential and a handle for each shared camera of interest. A notification is customized for each public service agency and each event by dynamically generating a link to a secure webserver which records geo-location or network identifiers for validation. Video servers may include virtual machines dedicated to each public service agency but controlled by a customer administrator.

9 Claims, 12 Drawing Sheets

Related U.S. Application Data

(60) Provisional application No. 62/305,523, filed on Mar. 8, 2016.

(51) Int. Cl.
*H04N 21/4223* (2011.01)
*H04N 21/239* (2011.01)
*H04N 21/414* (2011.01)

(56) References Cited

U.S. PATENT DOCUMENTS

| | | | | |
|---|---|---|---|---|
| 8,374,348 B2* | 2/2013 | Lecomte | ........... | H04L 29/06027 380/216 |
| 8,520,072 B1* | 8/2013 | Slavin | ............... | G08B 13/19684 348/143 |
| 9,172,724 B1* | 10/2015 | Reddy | ..................... | H04L 63/20 |
| 9,462,028 B1* | 10/2016 | Levinson | ................ | H04L 63/08 |
| 2006/0123238 A1* | 6/2006 | Kacker | ............... | H04L 63/0442 713/185 |
| 2006/0165405 A1* | 7/2006 | Kanai | ................ | H04N 5/23203 396/334 |
| 2007/0047950 A1* | 3/2007 | Asami | ................... | H04N 5/232 396/429 |
| 2008/0022297 A1* | 1/2008 | Walter | .............. | H04L 29/06027 725/25 |
| 2009/0070477 A1* | 3/2009 | Baum | ................. | H04L 12/2809 709/231 |
| 2012/0069131 A1* | 3/2012 | Abelow | ............... | G06Q 10/067 348/14.01 |
| 2012/0113265 A1* | 5/2012 | Galvin | ............... | H04N 5/23206 348/159 |
| 2012/0143996 A1* | 6/2012 | Liebald | ................... | G06F 15/16 709/219 |
| 2013/0047227 A1* | 2/2013 | Schultz | ................... | G06F 21/31 726/7 |
| 2014/0047560 A1* | 2/2014 | Meyer | ..................... | G06F 21/10 726/28 |
| 2014/0229835 A1* | 8/2014 | Ravine | ................ | H04L 12/1822 715/720 |
| 2015/0111524 A1* | 4/2015 | South | .................... | H04W 4/021 455/404.2 |
| 2015/0168144 A1* | 6/2015 | Barton | .................... | G06F 16/44 348/144 |
| 2015/0215586 A1* | 7/2015 | Lasko | .............. | G08B 13/19645 348/143 |
| 2015/0281550 A1* | 10/2015 | Mito | ..................... | H04N 7/181 348/211.2 |
| 2016/0134932 A1* | 5/2016 | Karp | ..................... | G08B 25/08 348/155 |
| 2016/0227384 A1* | 8/2016 | Mazzarella | ........... | H04W 4/021 |
| 2017/0134402 A1* | 5/2017 | Boivie | ............... | H04L 63/1483 |

\* cited by examiner

APPARATUS FOR SHARING PRIVATE VIDEO STREAMS WITH PUBLIC SERVICE AGENCIES

CROSS-REFERENCE TO RELATED APPLICATIONS

The present application is a continuation in part of application Ser. No. 15/253,871 and benefits from provisional application 62/305,523 filed 8 Mar. 2016 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The disclosure relates to over-the-air streaming of video surveillance images. More particularly, the methods and systems described herein relate to enabling emergency agencies to access private systems.

As is known, an emergency notification system is a method of facilitating the one-way dissemination or broadcast of messages to one or many groups of people, alerting them to a pending or existing emergency. Private surveillance networks containing cameras are intentionally not accessible to the public or government.

What is needed is a way to securely bridge from privately managed surveillance networks to public service agencies on site or enroute to an emergency.

BRIEF SUMMARY OF INVENTION

A private surveillance system notifies and activates emergency responders' access to video streams upon user command or automated triggering conditions.

Real-time video access is provided to first responders when a facility administrator activates access to share selected cameras. The first responders from public service agencies are invited before hand to establish authentication credentials and download applications to their mobile video display apparatus.

Immediate situational awareness can be crucial when there are intruders, a fire, or other emerging situations. The insights that first responders gain from the clear, deep visibility can directly impact their actions—from necessary evacuations, to the specific protective measures they might take.

The system enables facility administrators to notify pre-designated local public service agencies of this availability: critical, real-time insights in the event of an emergency situation—while still retaining their facility's full daily privacy. Facility administrators first pre-designate their list of public service agencies who could be authorized to view shared video during emergencies. They will also deputize other internal personnel to be capable of activating the emergency video feed.

Each public service agency will receive an invitational email. Upon acceptance of the terms and conditions, and establishing authentication, the public service agencies will download a mobile app so they will be able to instantly view the video while in transit during an emergency.

Video streams will continue to be private (unshared)—only accessible by the organization—until a facility administrator or deputy activates the access to shared cameras and selected permissioned streams of data or video. Permissions include display of static meta data such as location, motion sensing, spectrum, night vision, indoor, outdoor, type of camera, object recognition, facial recognition, heat sensing, and audio. Video streams of present and past epochs are controlled by selecting permissions and ranges. While the emergency video stream access is enabled, all designated public services agents can view permissioned video using a web browser or on a secure mobile app.

Optionally, facility administrators may vector specific camera images to the public service agents for viewing. All designated public service agencies could receive an email which includes direct links to the specified cameras. An open RESTful cloud video API allows the organization's physical security teams to integrate the public service agency video emails and access with emergency notification systems they may have in place for public service agents.

Each public service agency controls the distribution of the authentication credential within its department and affiliates.

Each public service agency may receive a uniquely customized notification with a dynamically generated link to a secure webserver which will record geo-location or network identifiers for validation or sanity checking.

The surveillance system data center will direct image streams from the shared cameras to the requesting browser after authentication e.g. user id and password, according to the permissions selected by the customer administrator. Video servers may include virtual machines dedicated to each public service agency. Any administrator of a customer in the region served by a public service agency may activate video streaming by the server through the end of the incident.

BRIEF DESCRIPTION OF THE SEVERAL VIEWS OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF INVENTION

Figure 1:
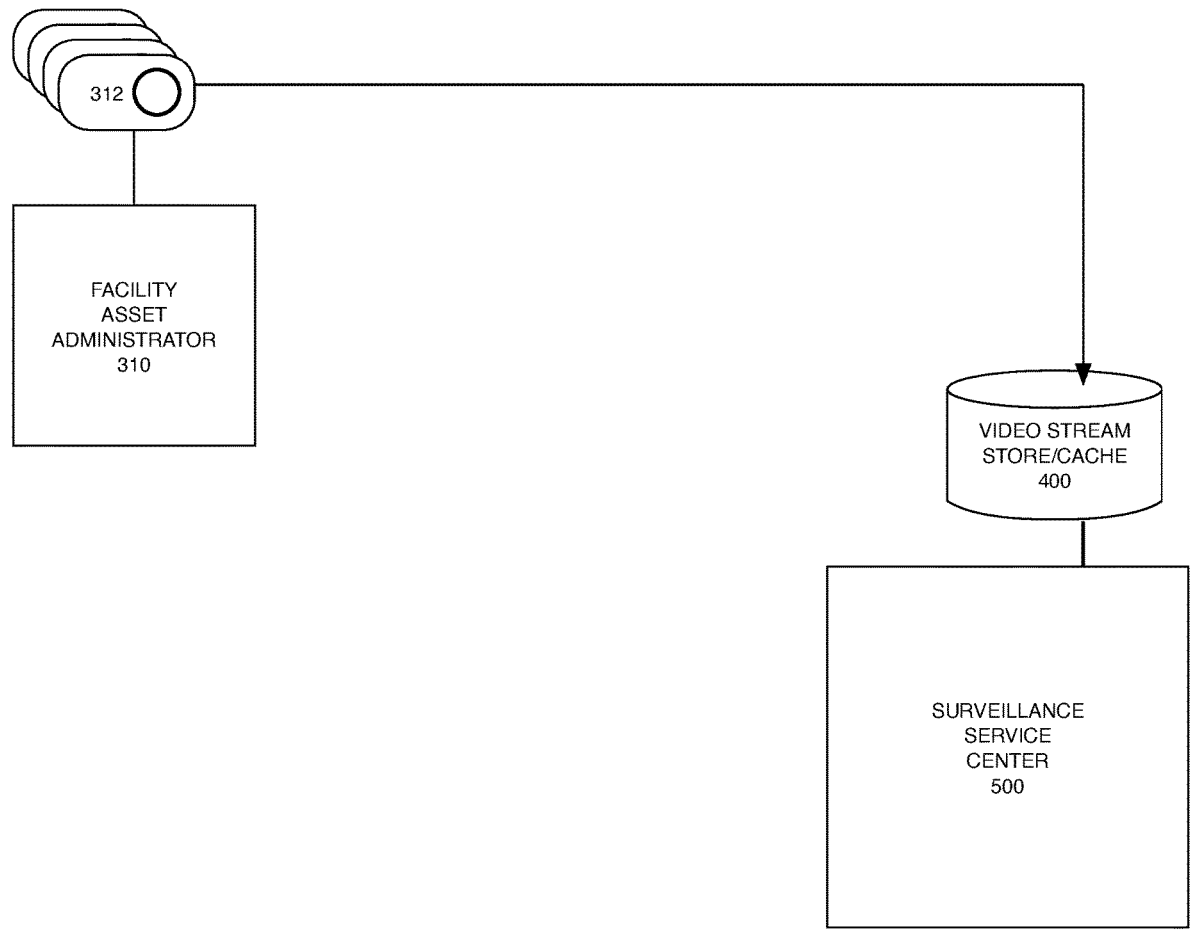
FIGS. 1-5 are block diagrams of a system with data flow among the facility, the surveillance service center and a public service agency.

A customer of a video surveillance service wishes to share image streams with public service agencies in the event of an emergency.

A surveillance facility asset administrator selectively stores camera parameters into an access permissions controller. This includes static meta data and a dynamic handle and video streaming boundaries for each camera intended to be selectably shared.

Previously nominated and enrolled public service agencies have established access credentials and configured their command center and mobile wireless equipment for live and historical downloads of images.

A selection of cameras will be shared when the administrator of the surveillance service customer sets permissions on each camera.

Upon notification by the administrator or a deputy, the public service agencies present their access credentials and requests image streams from a secure surveillance system server.

Permissions include display of static meta data such as type of camera, resolution, location, motion sensing, spectrum, night vision, audio, and facial or object recognition.

Video streams of present and past epochs are controlled by setting permissions and ranges.

A public service agency will receive an electronic notification from the administrator to present their access credential along with a handle for each shared camera. Non-limiting illustrative examples of an electronic notification includes a text, an email, a recorded voice message, and an IP packet e.g. UDP, or DNS query.

The handle for each camera may be dynamically synthesized for the event and discarded after the conclusion of the event. The administrator switches the permissions from static display to streaming the present epoch (live), a past epoch (history), or both.

Each public service agency may receive a customized notification with a dynamically generated link to a secure webserver which will record geo-location or network identifiers for validation or sanity checking.

In an embodiment, the notification to the public service agency includes a dynamically generated transient link to a secure webserver. The secure webserver records geo-location data or electronic identifiers from the browser and checks a white list or a black list. Is the request coming in from Ukraine via AOL? Is the request coming from an IPv6 host dedicated to a government network? There will be consequences, court orders, denial of service.

Non-limiting exemplary geo-location data and identifiers include LCID/CID Cell base station identifier, GPS coordinates, WiFi or Bluetooth signals, and IMEI.

In an embodiment, a notification message to a public service agency has an https link to an incident-unique login screen; reads and checks IPv6, IMEI, cell, GPS, Wi-Fi, geo-location fence which can be checked against known responder agency IP/domain name.

Each public service agency may access video streams through a dedicated virtual machine which is popped by a facility administrator and remains active until the end of the incident.

In an embodiment, each public service agency has a dedicated browser which accesses a dedicated API operating in a virtual machine image which can be popped open or purged from a processor core in the surveillance system server. The browser may carry its own certificate.

A video surveillance service shares image streams with first responder agencies in the event of emergency. Each customer of a video surveillance service nominates public service agencies which support his facilities. The agencies are invited to establish access credentials stored at the surveillance service data center. This can be by simply picking a user id and password.

A present epoch is live streaming from the point the administrator makes a selection until it is deselected. A past epoch enables the public service agency to look back in time before the administrator's selection for a day, a week, all recorded video. A simplified setting consists of choosing among live, past, and both.

The public service agency logs in at a surveillance system service center.

A conventional surveillance system includes a facility asset administrator console (administrator) in control of a plurality of surveillance cameras. The cameras stream video to a video stream store or cache co-located at a secure and redundant surveillance service center which is remote from the facility and its cameras.

The invention consists of a shared camera meta data and stream permissions store which is under the control of the administrator. The administrator sets permissions on whether the camera is shared with at least one public service agency. The administrator controls how much of the camera meta data is visible to public service agencies such as its camera type, physical location, its resolution, color/monochrome, motion detection, audio and heat capabilities, indoor, outdoor, object or facial recognition, visible/non-visible ranges of spectrum, live streaming, and range of history availability e.g. past epoch/current epoch. The administrator can store several sets of permissions and switch among them or control each permission separately. Some cameras may not be shared at all and are not in this permissions store.

The invention also includes a public service agency account management system which includes the accounts and passwords for an agent to login at the surveillance service center.

The system also includes a plurality of public service agency window layouts under the control of the administrator. The layouts identify the cameras for each window pane, but the permissions store determines what is transmitted to the window pane. Statistics, meta data, or a still test image may be used as a default during setup and test.

The system also includes an electronic message system to inform a public service agency that permissions have been set for access and that the administrator requests that the agency use the permitted video streams.

The responder first logs into the service center, receives a window layout identifying cameras, and requests display of surveillance content. The service center checks user name and password, retrieves and provides the current window layout, and streams whatever the administrator has enabled to access the shared camera meta data and video streams according to the permissions in stores.

Live streaming or history is enabled by the administrator through changing a parameter within permissions store. A facility asset administrator may select a window layout designed for different types of emergencies or sections of a campus or have different windows for different agencies.

For economy and privacy, video streams captured at a surveillance system are compressed and encrypted for transmission and storage. Directly accessing the stream would display unintelligibly. The system does not enable permanent access to any camera at any time.

The first responder agencies pertinent to a private surveillance network are invited, validated, and verified. Their dispatchers are supported through a secure channel. A two step process is performed by the surveillance system administration team upon determining a need for first responders: video streams and time ranges are selected for exposure by synthesizing temporary links, and the API are allocated to certain first responder agencies.

Emergency personnel embedded within the facility such as an enterprise's own campus police, fire, and ambulance may have access to cameras at all times. Personnel notified of an emergency event receive an access control message from the surveillance system. One or more video streams are played in the mobile app. For a perimeter intrusion, the internal and external view of the alerting sensor is displayed, motion detection for nearby cameras is enabled and triggers streams. For a fire/smoke/CO alarm, a stored stream of the time prior to the event is also scrollable. For a 911 call, video streams of a geo-location surrounding the call origin are enabled. Video streams include an audio track in one embodiment.

The streams are encrypted to specific first responder personnel identities or roles. Emergency services dispatchers have the capability to add message recipients to the viewer list. In an embodiment, a surveillance system notifies on-call emergency responders and enables access to video streams upon user command or automated triggering conditions.

In an emergency situation determined by conditions or a system operator, viewing by first responders is enabled of camera streams. The streams may be live or stored. The storage may be retained at the camera location or at a higher security data center. The user interfaces for the system operator and the responder require not more than one click or button press.

The system includes role based mobile video player devices assigned to emergency services personnel, typically fire, medical, and law enforcement. The first responders thus survey the situation before/during/after their arrival onsite. The mobile video players may be body worn, hand held, or integrated into their vehicles and on a personal network.

Each dispatched responder receives a message when they are provided access to view camera images. The messages may be delivered by email, an internal mobile message system or commercial SMS and texting. In an emergency situation a trigger condition causes an access credential to be sent to dispatched personnel. A security system operator may with one touch of a web application, enables access control and transmits notification to pre-stored responders. This may be email addresses of individuals, roles, or aliases. The operator may select from a stored list of message recipients. A fire alarm by sensor or by manual operation may trigger creation and transmittal of the notification.

The video player device presents live and stored streams with or without audio, from camera locations pertinent to the type of emergency. The stored images are at both the location and a centralized data repository with high bandwidth. The video stream is provided by whichever location has the highest mobile bandwidth. It may be from an antenna within the premises or one well linked with the cellular data network.

Notification and credentials may be delivered by email, SMS, or encrypted messaging service. For large authorities and agencies, only the dispatched responder should receive an access credential. Of course, the chain of command have supervisory privileges. Access may be restricted to devices within a geo-location boundary of the event location. To protect confidentiality, devices transmit their GPS or other location attribute and must be within a geo-fence to receive mobile streaming images.

The invention notifies first responders of availability of surveillance assets. Mobile devices are communicatively linked to video streams at security premises. Selected video streams are live or replayed from storage. Access control may be triggered by system user, or automated by an event.

During installation and initialization, a bidirectional system validates first responders. Public service agencies submit data to offer services for a region. A third party vets proposed first responders to confirm they are genuine and not malicious or fraudulent. The list of validated first responders is presented to surveillance system operators during a pre-designation session. Public service agencies must provide credentials, references, and desired region and responsibilities to the vetting authority. Upon confirmation by the vetting party they are added to the list of valid shared video recipients. Periodic tests confirm the continued validity.

In an embodiment, an apparatus presents an open nomination portal for agencies to self-nominate, potential service clients to suggest, customers to enroll, and the general public to offer contact information for first responder entities. A second portal presents a list of verified contact information which may be selected for pre-designation by system administrators for their facilities. A transformation of nominees to selectable first responders includes checking that the addresses are not relays, really connect to certified responder organizations, are not aliases or misleading names, and can be trusted to receive the emergency live video feed and refer it to actual sworn first responders.

Facility administrators pre-designate their list of first responders who will be authorized to view the video during emergencies. They will also authorize specific internal personnel to be capable of turning on the emergency live video feed.

To ensure that the connection is made, after the administrator submits the first responders name, organization and email address, each first responder will get a notification email and 'accept' the request. Typically they can download app and download instructions so first responders can view it remotely/in transit. The notification step allows the first responder to opt out of being a first responder to one or more surveillance systems. An unknown or undesired source of video streams can be refused by the first responder during the confirmation process.

Following set up, the video streams continue to be private—accessible by organization only—until their explicitly authorized personnel activates access to selected video streams. As a safeguard to avoid accidentally sending alerts, the administrators must navigate a two step process. In test mode, only avatars in a virtual reality set are displayed.

Once the emergency video access is enabled, all designated first responders can view video from certain configuration controlled major web browsers or a trusted mobile app for a limited range of time. Sharing with a first responder allows access to historical time from a preset point prior to activation time and continues active until cancelled. The entire history stream is not enabled for any emergency event.

The apparatus further includes a circuit to enable first responder to sort, filter, and prioritize which cameras they can see to efficiently manage access to possibly relevant content. In an example, all cameras in a city or geography may be desired during a dynamic situation. In that case, the responders covering a part of the zone would need to sort by geography or active motion within a time period. The simplest sort would be the superset of cameras made available by multiple active surveillance system operators. A responder may also want to add tags such as grouping street views, indoor lobbies, indoor views to better identify which cameras are potentially useful. Tags are set by either or both the responders and the system operators. Logic operations may select tags matching a criteria or pattern. Responders may add any tags. Generally system operators have a limited menu of available tags such as location, spectrum, orientation, color, sound, and range.

The apparatus provides the surveillance system operator with an option to identify specific cameras or cameras within geo-location zones for the first responders to view. All designated first responders may receive an email notification with links to particular cameras The invention further has an open RESTful cloud video DAPI to allow the organizations physical security teams to integrate the first responder video alerts and access with other emergency notification systems they may be putting in place for first responders.

The system is distinguished from conventional surveillance systems by its on-demand cloud based security and operations video management system (VMS) which has both cloud and on-premise recording for redundancy. The apparatus delivers secure, encrypted recording, camera management, mobile viewing and alerts. The platform uses time based data structures used for indexing, search, retrieval and analysis of the live and archived video.

In an embodiment, the method performed by a responder director also includes: receiving nominated 1st responders; identifying dispatch portals for notification of each 1st responder; and verifying identity and security of dispatch portal for each 1st responder.

Both public service agencies and private surveillance system administrators must regularly confirm their mutual agreement.

In an embodiment, the method performed by a responder director also includes: determining which surveillance systems are served by each verified 1st responder; determining that each surveillance system administrator potentially entrusts a verified 1st responder with a private video stream; and configuring the responder director to transmit a deep link to appropriate video streams upon activation by its surveillance system administrator.

One aspect of the invention is a system for activation of emergency responder access to video streams including: a responder pre-designation apparatus whereby system administrators pre-designate a list of first responders who upon receiving an alert will receive video during an event; a notification confirmation apparatus whereby pre-designated first responders confirm their acceptance and receive a secure mobile application with encryption and identity confirmation; an event activation apparatus whereby an authenticated system operator upon determining a situation requires an emergency response, triggers a video feed through an API to mobile devices equipped with the secure mobile application; a notification apparatus whereby an authenticated system operator selects cameras in geo-location zones or specific cameras, transforms camera identities to a deep link format, and transmits a message containing said deep link to the list of first responders; and an application programming interface integration apparatus to receive and respond to systems operated by physical security teams.

In an embodiment, the method for operation of the system also includes: receiving by application programming interface (API), event notifications, responder contact lists, camera identities, and requests to stream video images to a responder mobile device; transmitting a video image stream to a responder mobile device in response to receiving a request by an API; receiving from a user interface, a list of first responders are pre-designated to receive a stream of video images upon determination of a condition; transmitting a notification to an address of the list of pre-designated first responder; receiving acceptance from a pre-designated first responder of the intention to receive a stream of video images upon a condition and that the address is correct; enabling a downloaded application on the mobile device of the responder; receiving a determination by sensors or by an authenticated system operator of a condition; and enabling emission of a stream of video images to an enabled application on the mobile device of the responder.

One aspect of the invention is a system for activation of emergency responder video streams including: a responder pre-designation apparatus whereby system administrators pre-designate a list of first responders who upon receiving an alert will receive video during an event; a notification confirmation apparatus whereby pre-designated first responders confirm their acceptance and receive a secure mobile application with encryption and identity confirmation; an event activation apparatus whereby an authenticated system operator upon determining a situation requires an emergency response, triggers a video feed through an API to mobile devices equipped with the secure mobile application; a notification apparatus whereby an authenticated system operator selects cameras in geo-location zones or specific cameras, transforms camera identities to a transient link format, and transmits a message containing said transient link to the list of first responders; and an application programming interface integration apparatus to receive and respond to systems operated by physical security teams.

Another aspect of the invention is a method for operation of the system described above having the processes: receiving by application programming interface (API), event notifications, responder contact lists, camera identities, and requests to stream video images to a responder mobile device; transmitting a video image stream to a responder mobile device in response to receiving a request by an API; receiving from a user interface, a list of first responders are pre-designated to receive a stream of video images upon determination of a condition; transmitting a notification to an address of the list of pre-designated first responder; receiving acceptance from a pre-designated first responder of the intention to receive a stream of video images upon a condition and that the address is correct; enabling a downloaded application on the mobile device of the responder; receiving a determination by sensors or by an authenticated system operator of a condition; and enabling emission of a stream of video images to an enabled application on the mobile device of the responder.

QRcodes on garments worn by participants allow floating identity or role tags to be displayed in the images. Applicant defines for use in this application, obfuscated camera handles, or obhandles, a term to refer to aliases for camera identifiers which may be changed by the administrator at any time, manually or algorithmically to reduce risk of loss of privacy. An obhandle may be arbitrary, frequently changed, or cryptographically generated so that exposure over public communication channels does not reveal a permanent camera identifier.

Referring now to FIG. 1, a conventional surveillance system includes a facility asset administrator console 310 (administrator) in control of a plurality of surveillance cameras 312. The cameras stream video to a video stream store 400 or cache co-located at a secure and redundant surveillance service center 500 which is remote from the facility and its cameras.

Figure 2:
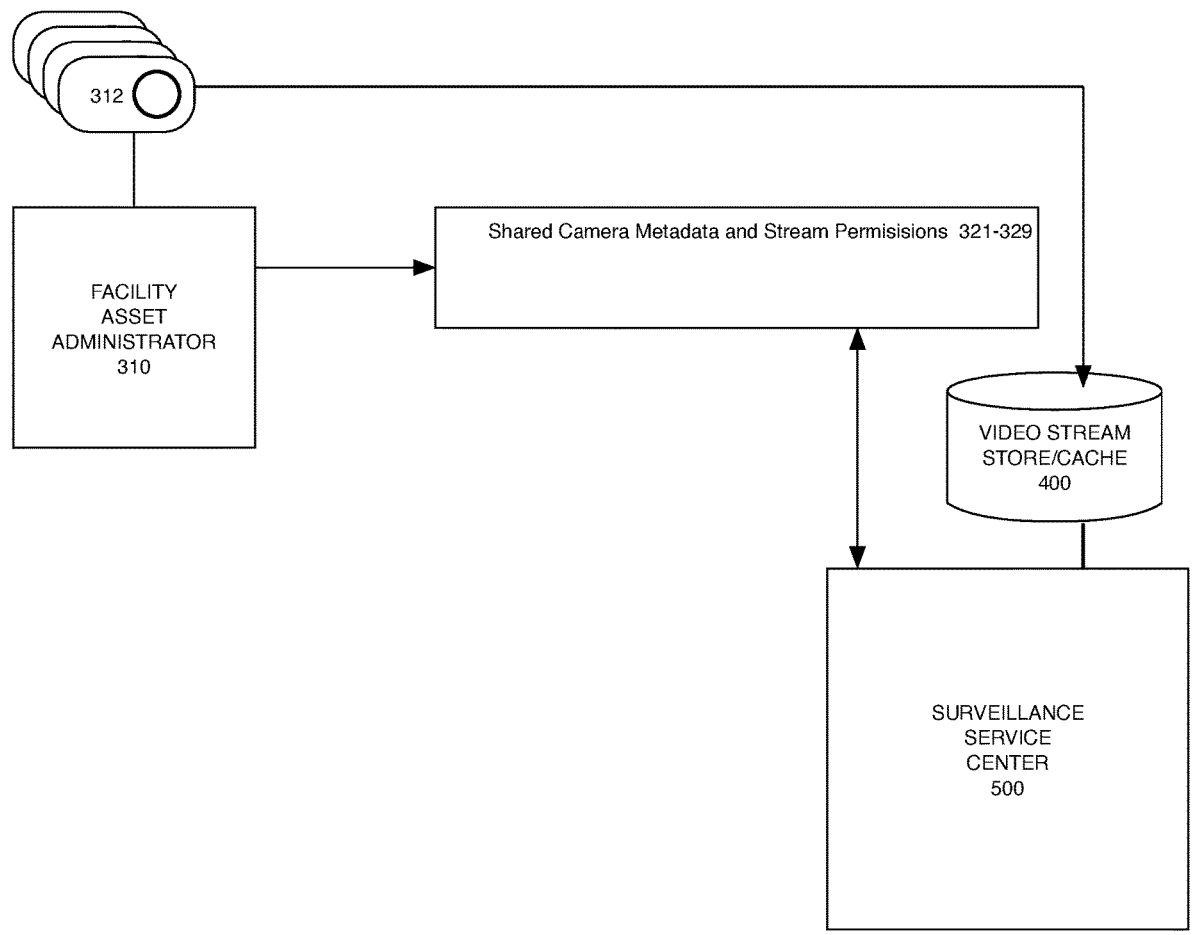

The invention illustrated in FIG. 2 includes a shared camera meta data and stream permissions store 321-329 which is under the control of the administrator. The administrator sets permissions on whether the camera is shared with at least one public service agency. The administrator controls how much of the camera meta data is visible to public service agencies such as its physical location, its resolution, color/monochrome, resolution, visible/non-visible ranges of spectrum, live streaming, and range of history availability e.g. past epoch/current epoch. The administrator can store several sets of permissions and switch among them or control each permission separately. Some cameras may not be shared at all and are not in this store.

Figure 3:
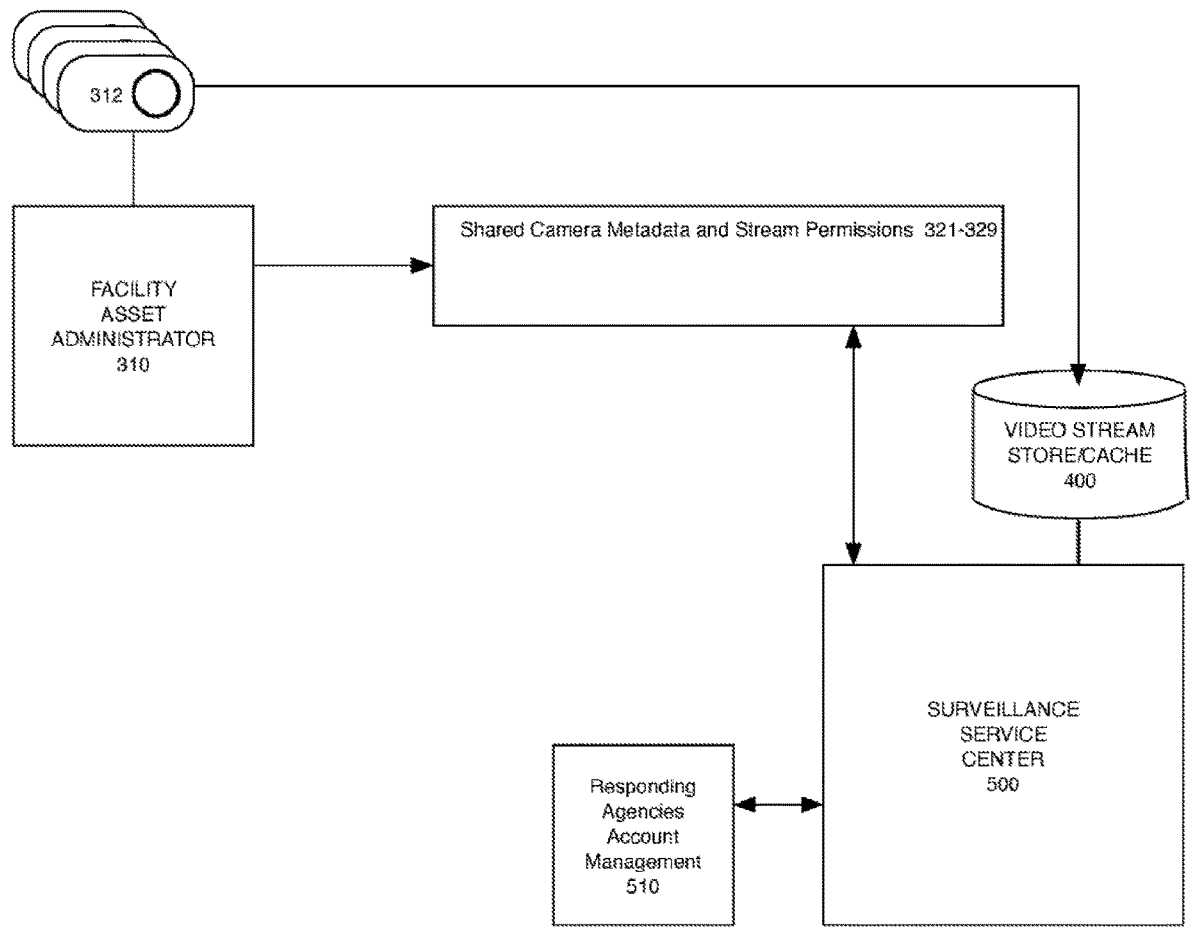

In FIG. 3 is shown that the invention also includes a public service agency account management system 510 which includes the accounts and passwords for an agent to login at the surveillance service center 500. In various embodiments, the apparatus also includes a permissions controller for a plurality of cameras (controller); the controller remotely coupled to a facility administrator console; the controller further coupled to the video stream server, and a public service agency account manager circuit (manager), the manager remotely coupled to at least one browser on a mobile device, and coupled to the video server; a video stream cache and store; a public service agency authentication circuit and credential store; a shared camera permissions circuit to enable streaming metadata and images over a range of time for each shared camera; a circuit to request a geo-identifier from an authenticated public service agency video display; a store of blacklist geo-identifiers; and a circuit to terminate a connection upon matching a blacklist geo-identifier with a geo-identifier received from a mobile wireless video display.

Figure 4:
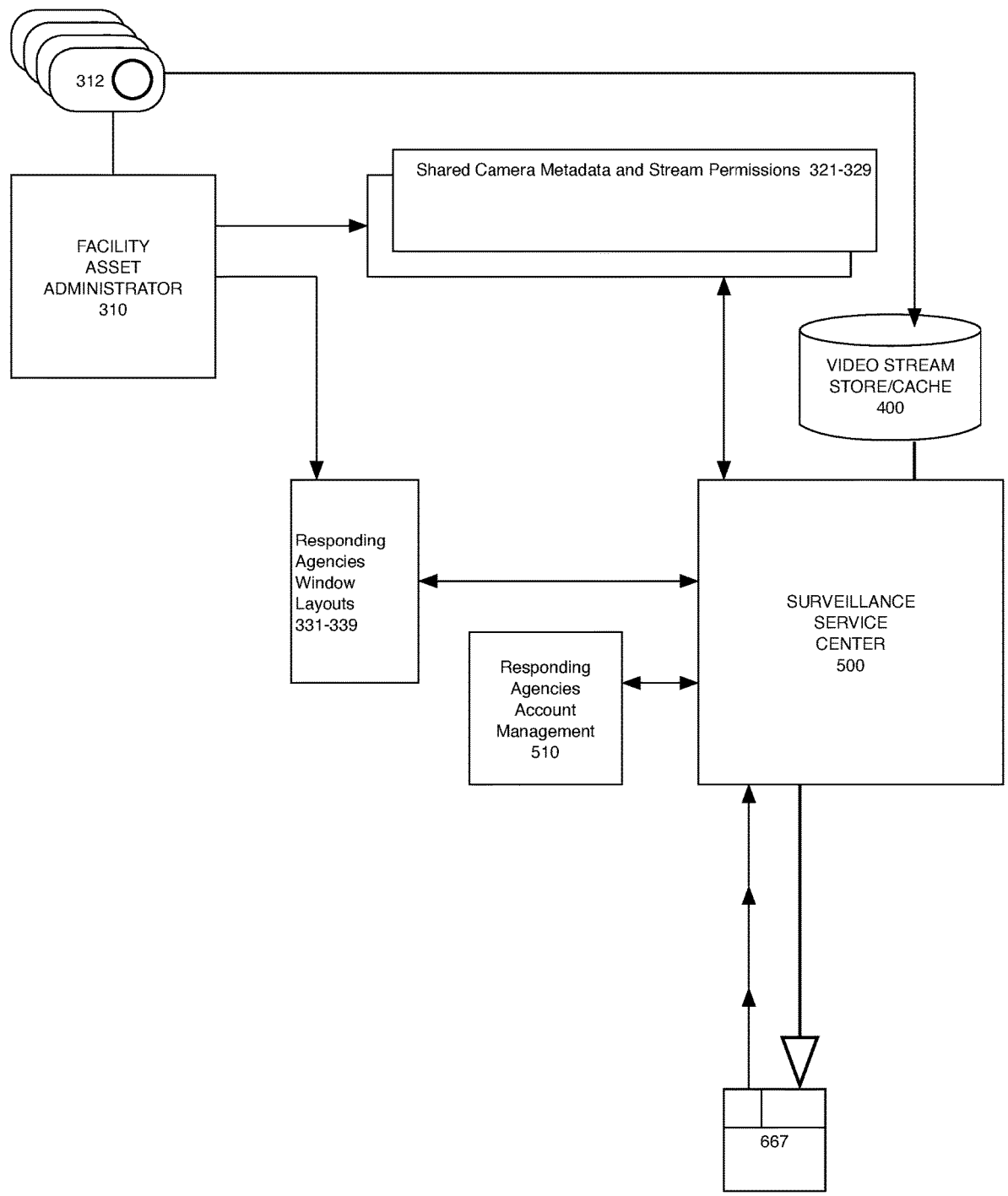

FIG. 4 discloses that there are a plurality of public service agency window layouts 331-339 under the control of the administrator 310. The layouts identify the cameras for each window pane, but the permissions store determines what is transmitted to the window pane. Statistics, meta data, or a still test image may be used as a default during setup and test of a display 667.

Figure 5:
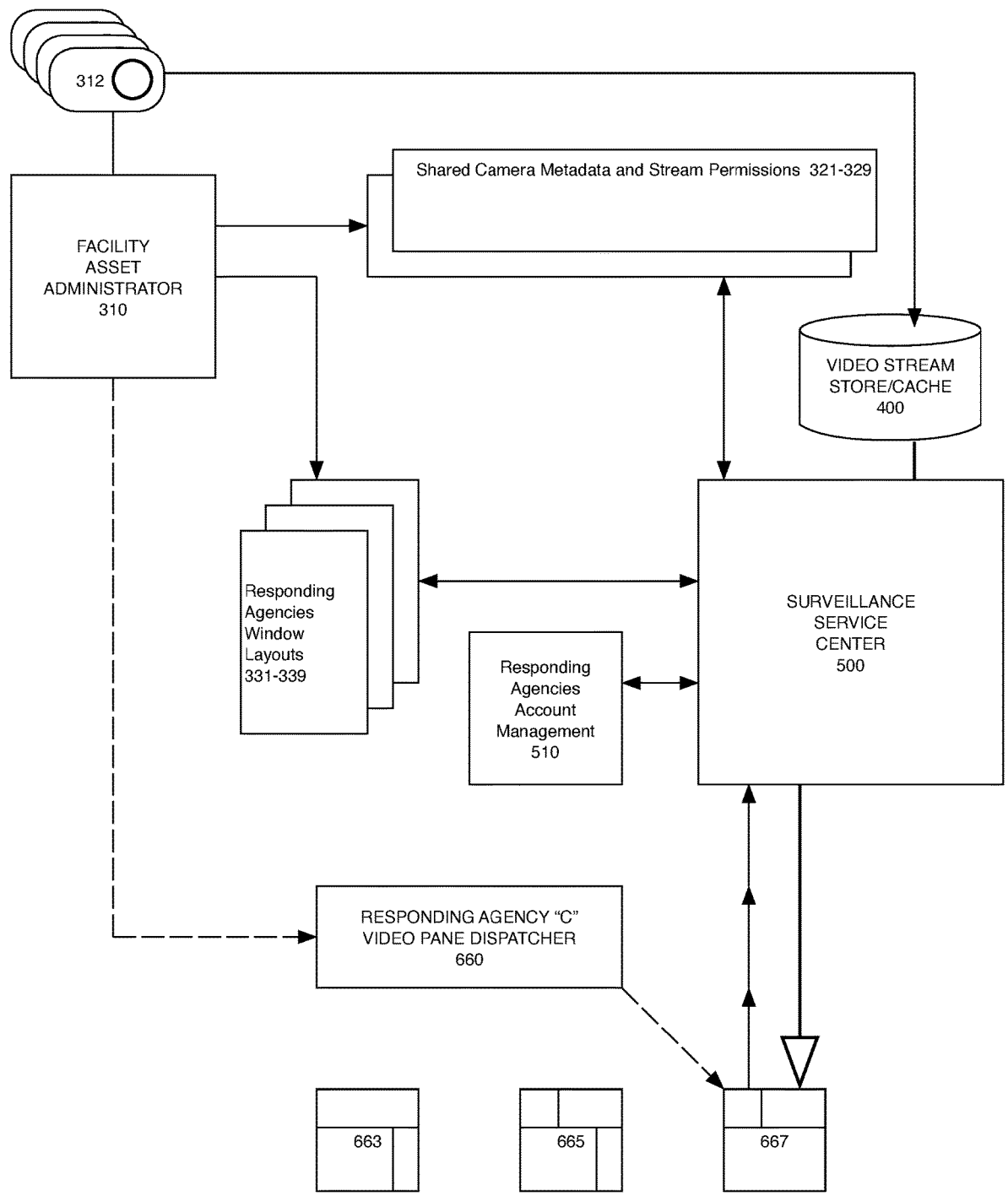

FIG. 5 includes an electronic message system to inform a public service agency dispatcher 660 that permissions have been set for access and that the administrator requests that the agency use the permitted video streams. Dispatcher selects among mobile displays 663 665 667 to assign as first responder.

The responder 667 first logs into the service center, receives a window layout identifying cameras, and requests display of surveillance content. The service center checks user name and password, retrieves and provides the current window layout, and streams whatever the administrator has enabled to access the shared camera meta data and video streams according to the permissions in stores 321-329

Live streaming or history is enabled by the administrator through changing a parameter within permissions store. A facility asset administrator may select a window layout designed for different types of emergencies or sections of a campus or have different windows for different agencies.

Figure 6:
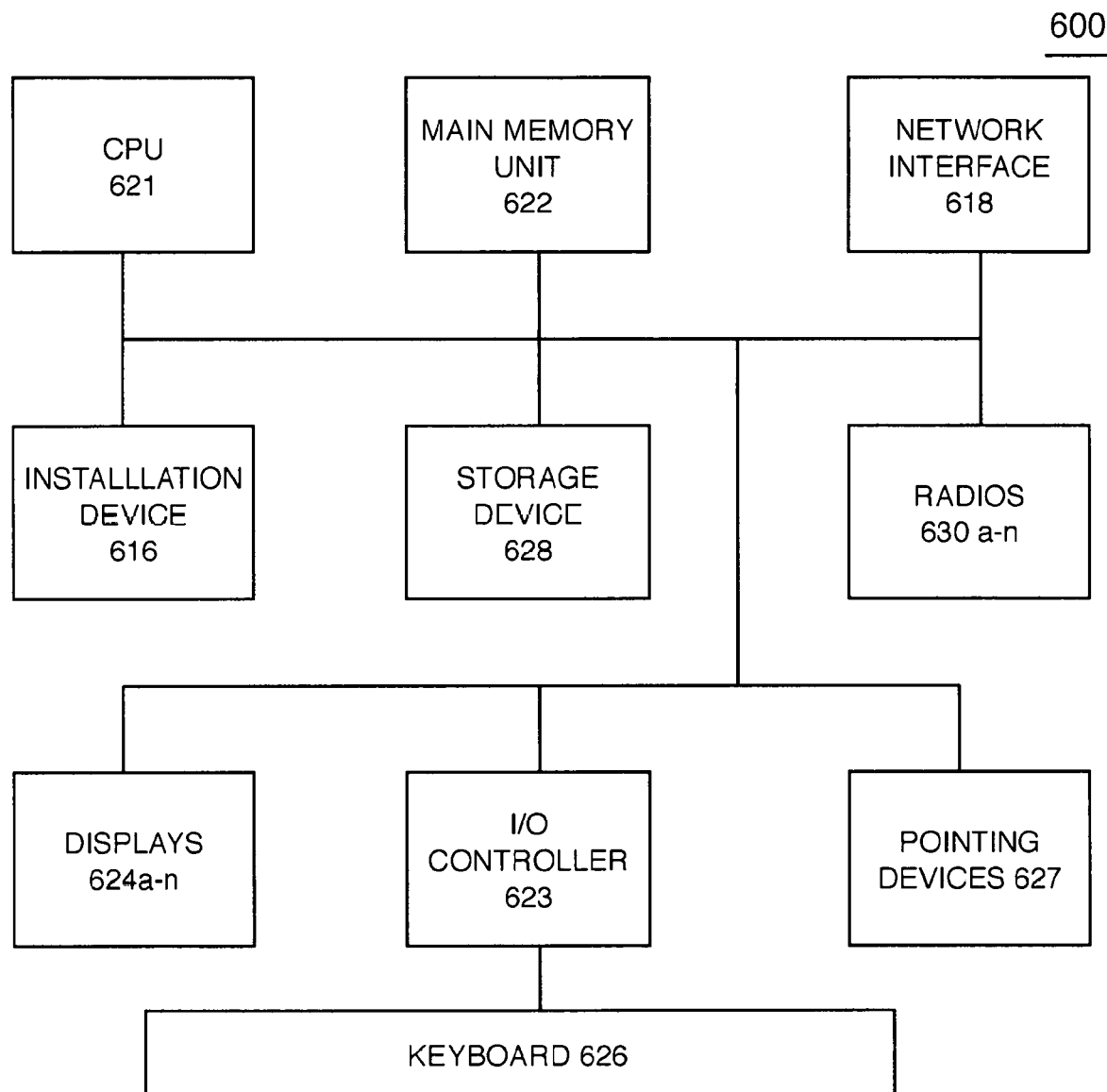
FIG. 6 is a block diagram of a processor suitable for performing a method embodiment of the invention.

FIG. 6 is a block diagram of a processor having one or more cores within CPU 621. As is known, systems disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

FIG. 6 depicts block diagrams of a processor or computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624*a-n*, a keyboard 626, a pointing device 627, such as a mouse or touchscreen, and one or more other I/O devices 630*a-n* such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, with one or more cores, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor.

Main memory unit 622 may be one or more memory chips capable of storing data and allowing any storage location to be directly accessed by the microprocessor 621. The main memory 622 may be based on any available memory chips.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 10 manufactured by Microsoft Corporation of Redmond, Wash.; MAC OS and iOS, manufactured by Apple Inc., of Cupertino, Calif.; or any type and/or form of a Unix operating system.

In some embodiments, the computing device 600 may have different processors, operating systems, and input devices consistent with the device. In other embodiments the computing device 600 is a mobile device, such as a JAVA-enabled cellular telephone or personal digital assistant (PDA). The computing device 600 may be a mobile device such as those manufactured, by way of example and without limitation, Kyocera of Kyoto, Japan; Samsung Electronics Co., Ltd., of Seoul, Korea; Nokia of Finland; Hewlett-Packard Development Company, L.P. and/or; Sony Ericsson Mobile Communications AB of Lund, Sweden; or Research In Motion Limited, of Waterloo, Ontario, Canada. In yet other embodiments, the computing device 600 is a smart phone, Pocket PC Phone, or other portable mobile device supporting Microsoft Windows Mobile Software.

In some embodiments, the computing device 600 comprises a combination of devices, such as a head worn augmented reality display, or a mobile phone combined with a digital audio player or portable media player. In another of these embodiments, the computing device 600 is device in the iPhone smartphone line of devices, manufactured by Apple Inc., of Cupertino, Calif. In still another of these embodiments, the computing device 600 is a device executing the Android open source mobile phone platform distributed by the Open Handset Alliance; for example, the device 600 may be a device such as those provided by Samsung Electronics of Seoul, Korea, or HTC Headquarters of Taiwan, R.O.C. In other embodiments, the computing device 600 is a tablet device such as, for example and without limitation, the iPad line of devices, manufactured by Apple Inc.; the Galaxy line of devices, manufactured by Samsung; and the Kindle manufactured by Amazon, Inc. of Seattle, Wash.

Figure 7:
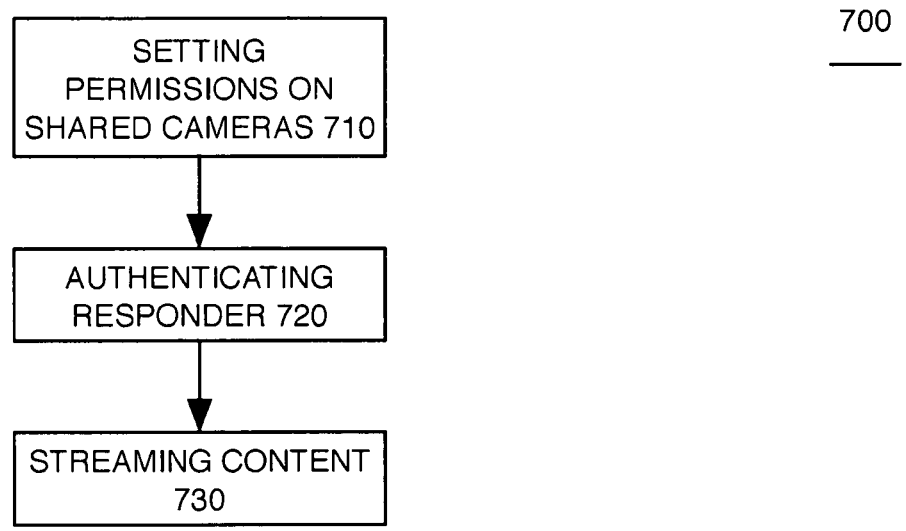
FIGS. 7-10 are flow charts of steps and processes in an exemplary method embodiment.

Referring to FIG. 7 a method is disclosed 700, comprising the steps performed by circuits controlling a video streaming server 500: determining handles for shared cameras, streaming permissions, and meta data in a permission control circuit 321 responsive to a facility administrator console 310 and storing a public service agency window layout 331 responsive to a facility administrator console 310 containing handles for video camera streams 710; verifying authentication credentials 720 received from a public service agency mobile device 667; and upon receiving access requests from a display device streaming video content 730; wherein video content is one of historical video images, live video images, and static meta data from a shared camera.

Figure 8:
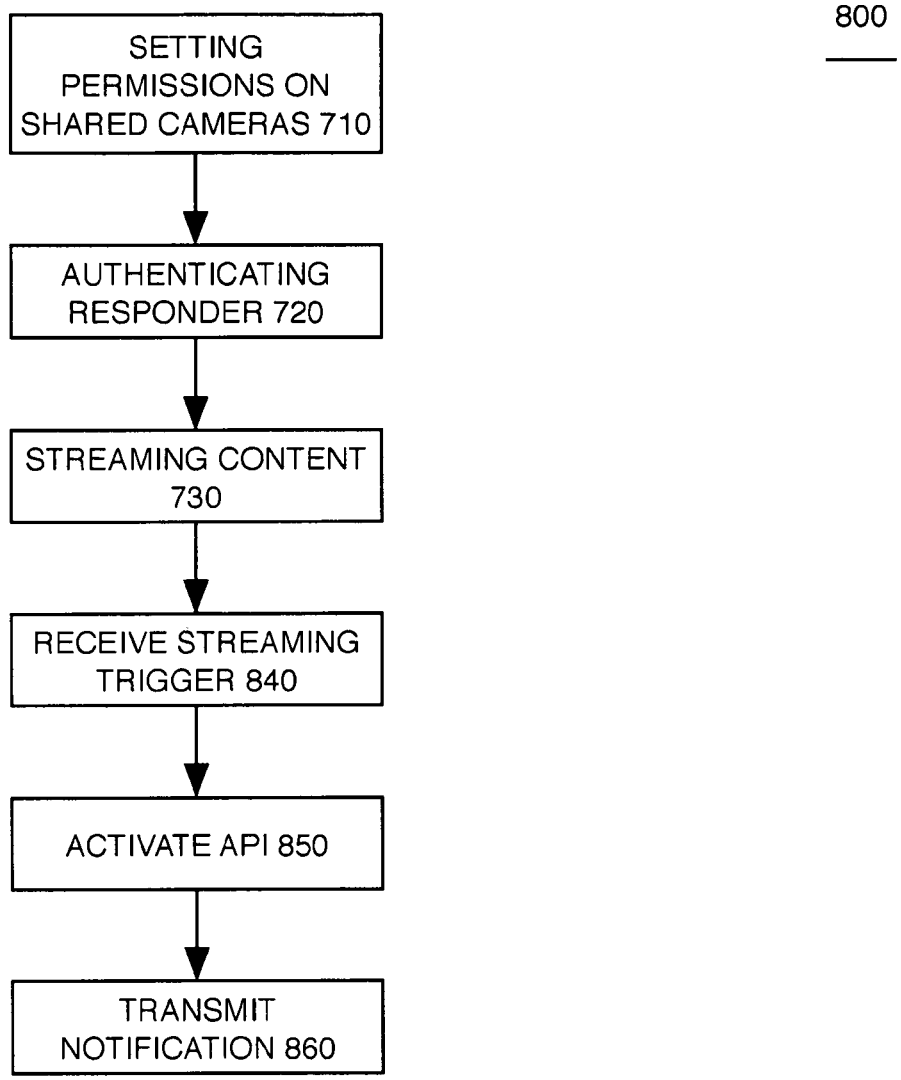

FIG. 8 illustrates a method at a server, the method comprising: receiving from a first user a trigger to notify a pre-arranged 1st emergency agency (responder) of camera stream availability 840; activating an application programming interface (API) to access selected cameras by watcher devices operable by the responder 850; and transmitting to the responder a notification of API activation 860.

Figure 9:
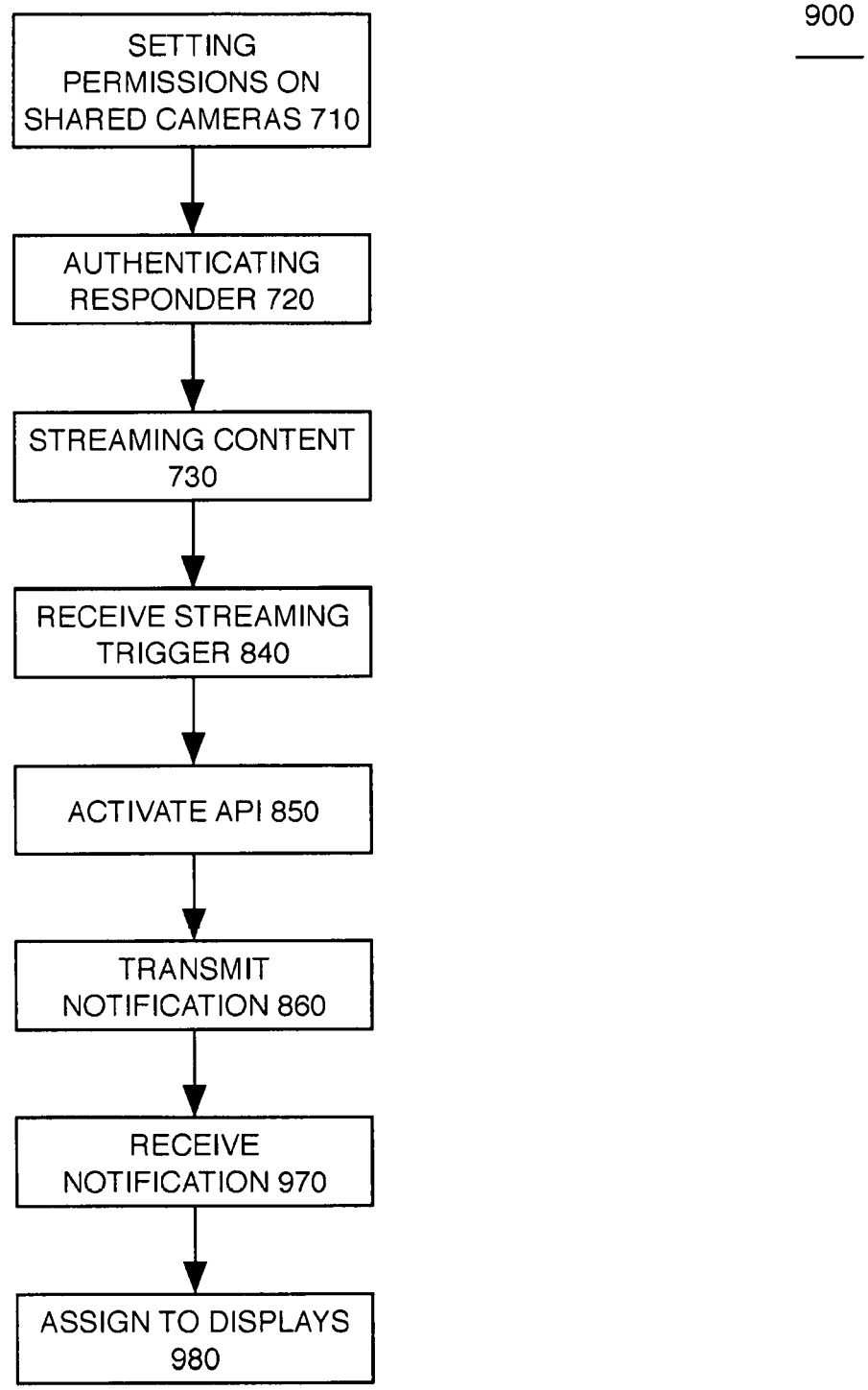

FIG. 9 illustrates a method at an emergency agency comprising: receiving a notification of camera stream availability from a server 970; and assigning streams of camera images to responder mobile displays 980.

Figure 10:
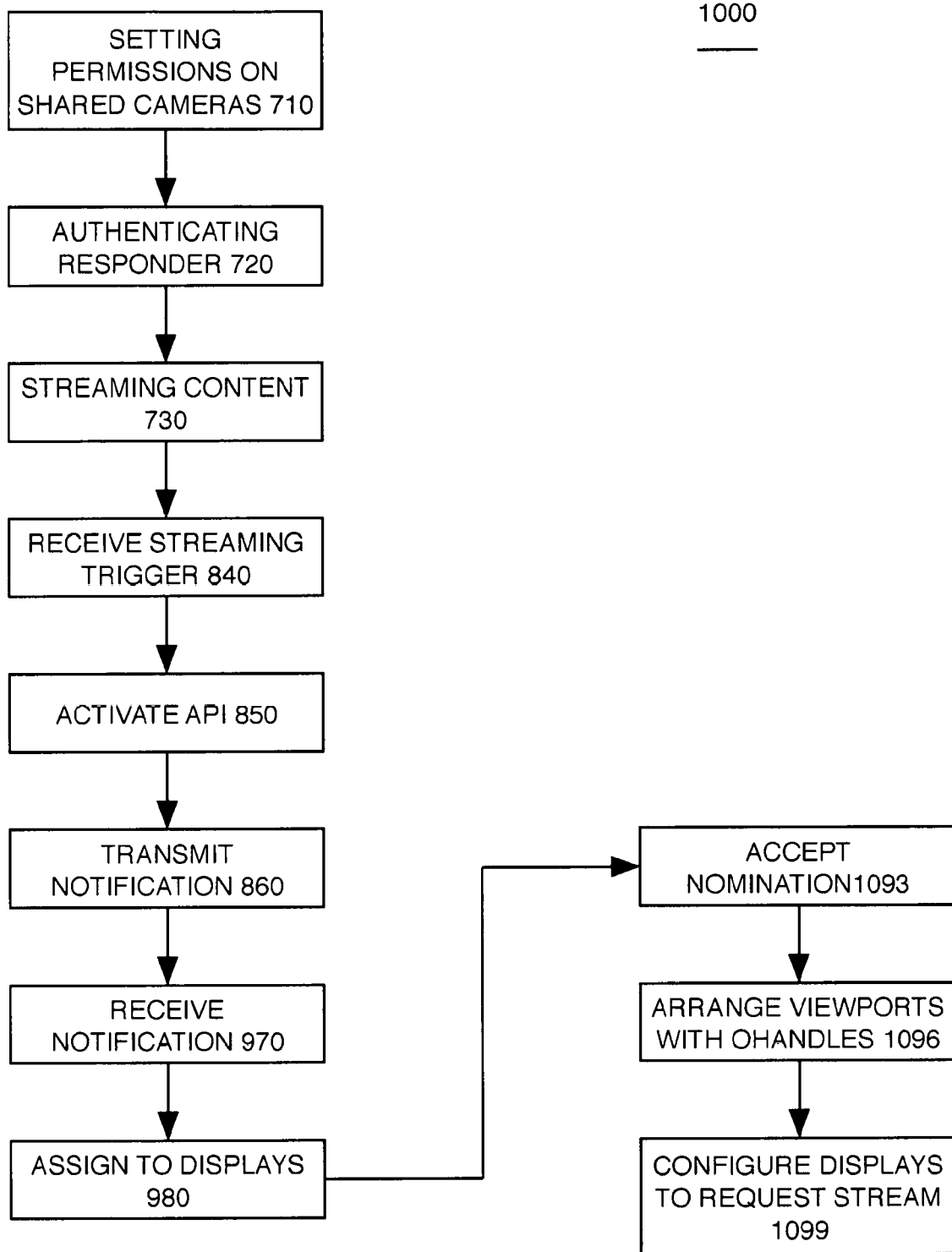

FIG. 10 illustrates a method at a public service agency: accepting a nomination from at least one surveillance system user to access a plurality of camera streams 1093; arranging a plurality camera streams into a pre-arranged viewport by obfuscated handles 1096; and configuring a display to request a camera stream in a viewport 1099.

Figure 11:
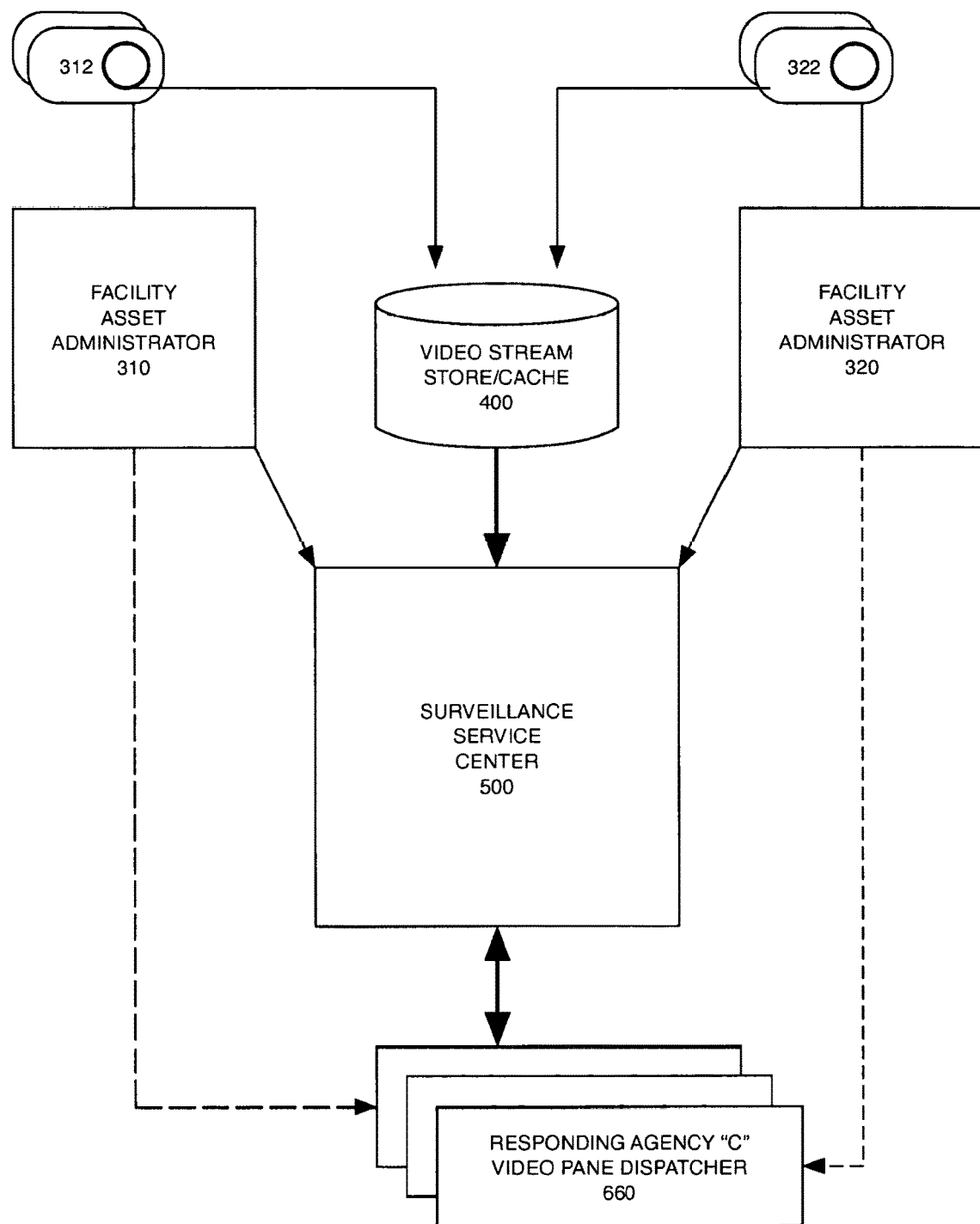
FIGS. 11-12 are block diagrams of system embodiments.

FIG. 11 is a block diagram of a plurality of customers of a video surveillance service enabling a one or more public service agencies to view shared camera streams. A plurality of Facility Asset Administrators (FAA) 310 320 control video surveillance cameras 312 322 which capture and transmit video streams to the store/cache 400 associated with a surveillance service center 500. Each FAA controls streaming from the surveillance service center 500 to at least one Public service Agency 660. It could be two different agencies or if they are neighbors, the same Public service Agency. Separately, each FAA notifies a video pane dispatcher of video stream availability.

Figure 12:
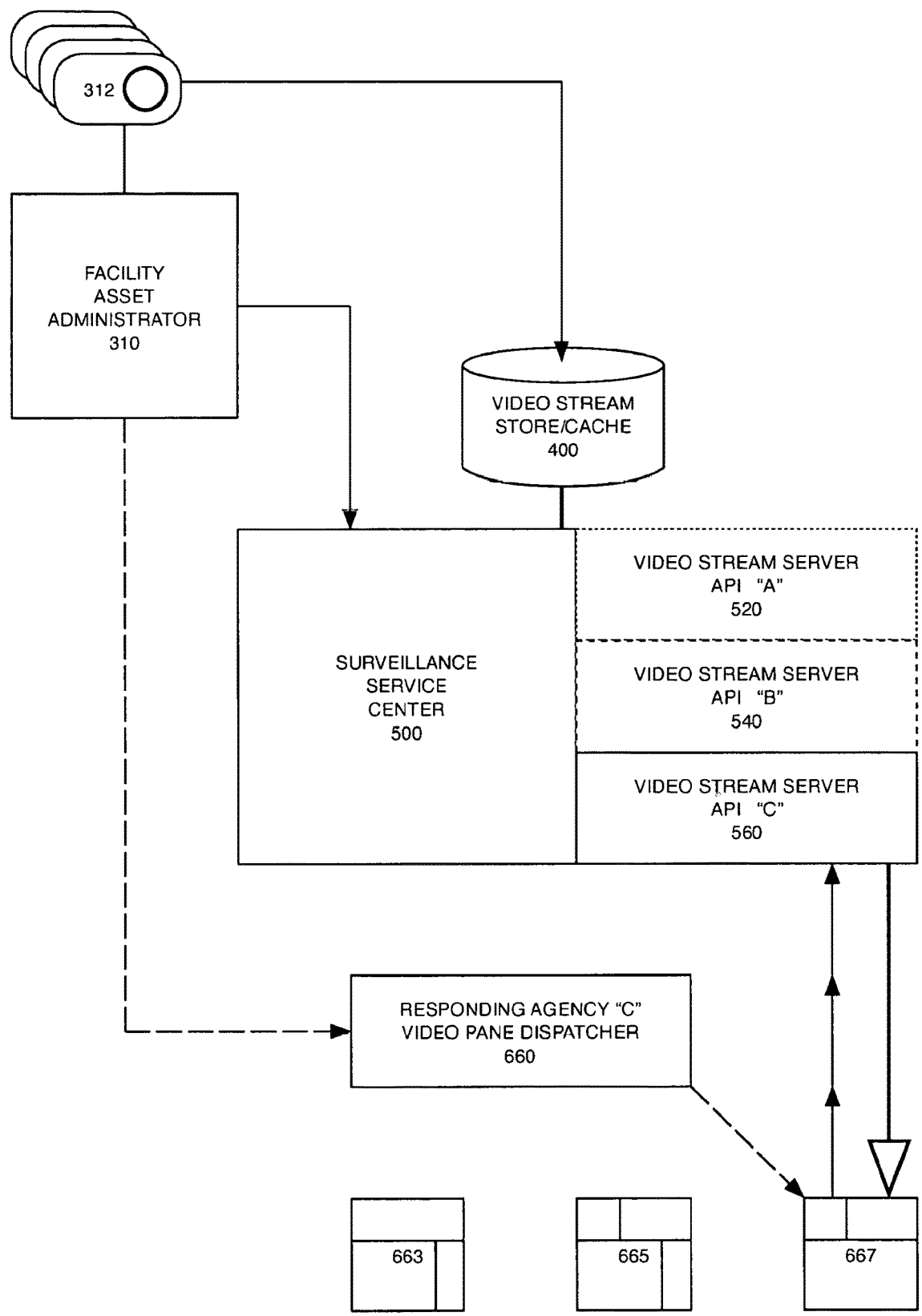

FIG. 12 is a block diagram of details of one video stream path. The surveillance service center 500 has a plurality of processor cores 520 540 560 each of which could support a dedicated video stream server. In FIG. 12, FAA 310 has popped a virtual machine and API useful only to Agency "C" into processor core 560. FAA 310 has also notified the Public service Agency "C" video pane dispatcher 660 of shared cameras that may be streamed through the server dedicated to Agency "C". The dispatcher forwards the shared camera identifiers to at least one mobile video display 667. The app on the display transmits authentication credentials and requests meta data or live video or video history for each of the window panes in its window layout. The server responds and streams the requested video. If a different FAA in the same city transmits a notification message, the video stream server 560 will provide the mobile video display with streams from its shared cameras.

One aspect of the invention is a system for sharing private video streams with first responders, the system including: a first responder pre-designation selection subsystem means for selection of cameras, epochs, and meta data for sharing, designation by facility administrator of deputies (Activators) authorized to activate first responder video feed, and designation of which first responder agencies are nominated to receive shared camera feed; a closed loop confirmation subsystem means for invitation/nomination to enroll, acceptance and enrollment, transmission of executable mobile viewer application code, and installation in wireless mobile displays; an activation subsystem means for notification of activation, focus on specific cameras selected by Activator, and communication of emphasis on said specified camera;

and a responder subsystem means for presentation and authentication such as by password and user identity at a login form, submission of a request for authorized camera feeds, reception of meta data for display or configuration, reception of a live video feed from a shared camera, reception of a video history with navigation control, and automatic camera feed selection upon motion detection.

Another aspect of the invention is an apparatus for sharing private video streams, the apparatus including: a permissions controller for a plurality of cameras (controller); the controller remotely coupled to a facility administrator console, a video stream server (video server); the controller further coupled to the video stream server, and a public service agency account manager circuit (manager), the manager remotely coupled to at least one browser, and coupled to the video stream server.

In an embodiment the apparatus also includes: a video stream receiver (receiver); the receiver remotely coupled to a plurality of cameras. In an embodiment the apparatus also includes: a video stream store (video store); the video store coupled to the receiver. In an embodiment, the manager is; a circuit to receive and validate a password and user identity for a public service agency. In an embodiment the apparatus also includes: a circuit to receive commands from a facility administrator to set and reset a camera for sharing.

In an embodiment the apparatus also includes: a circuit to receive commands from a facility administrator to set permission for at least one of live streaming and history streaming.

In an embodiment the apparatus also includes: a circuit to format a webpage having window frames populated with identifiers of shared cameras; and a circuit to receive at least one request from a remote browser to transmit at least one video image of a shared camera.

In an embodiment, the permissions controller includes: stored values of meta data of the camera; and stored values streaming permission for live and for history.

In an embodiment, the video stream server includes: a circuit to receive navigation commands from the browser; a circuit to search forward or backward in time of recordation of the video stream; and a circuit to transmit at least one video frame according to navigation commands.

Another aspect of the invention is a method for operation of a surveillance system video server, the method including: receiving an authentication credential from a mobile video display; verifying the authentication credential is bound to a public service agency; reading stored parameters and permissions for at least one shared camera; initiating a video streaming service for shared camera images; and, public service to requests for shared camera images from the mobile video display according to stored permissions.

In an embodiment, the method for operation of a surveillance system video server also includes: transforming stored video images into a format suitable for transmission on a mobile video display; and transmitting displayable images to the requestor.

In an embodiment, the method for operation of a mobile video display includes: receiving a notification message from facility administrator; and submitting credentials to a surveillance service data center, wherein credentials are a password and user identity.

In an embodiment, the method for operation of a mobile video display also includes: getting a stream of video images recorded beginning at a point in time of permission setting at a mobile video display. As is known "getting" refers to transmitting a command to a server to elicit a file transfer such as by the http command syntax "get".

In an embodiment, the method for operation of a mobile video display also includes: getting a stream of video images recorded prior to a point in time of permission setting at a mobile video display.

In an embodiment, the method for operation of a mobile video display also includes: getting displayable static meta data about a camera at a mobile video display.

In an embodiment, the apparatus also includes: a video stream cache and store; a public service agency authentication circuit and credential store; a shared camera permissions circuit to enable streaming metadata and images over a range of time for each shared camera; a circuit to request a geo-identifier from an authenticated public service agency video display; a store of blacklist and whitelist geo-identifiers (geo-store); a circuit to initiate a consequence after comparing the geo-store with a geo-identifier received from a mobile wireless video display.

In an embodiment, the method also includes: upon determining an emergency condition, selecting at least one camera for exposure to public service agencies; setting permissions for at least one camera to video streaming for a period of time beginning before, ending after, or including the current time of setting; transmitting by secure message to the public service agency a secure link to the video stream server; whereby the public service agency is notified to request streaming from the selected camera(s), receiving a request from a secure browser; authenticating a user by an authentication credential, in an embodiment an authentication credential is a password; inspecting a request to determine a geo-identifier of the mobile video display; recording to a store a geo-identifier for each mobile video display; and checking recorded geo-identifiers for consistency with public service agency's owned equipment, wherein a geo-identifier is one of a GPS coordinate, a LCID, an IPv6 address, a Wi-Fi access point, a Bluetooth beacon, a messaging host server, and an IMEI number.

In an embodiment, reference to a camera is hidden by obfuscated camera handle or identifier i.e. obhandles. Malicious recording and replaying requests for video streams without the assistance of the administrator could fail due to expired obhandles. In an embodiment, the method also includes: a plurality of virtual machine images with dedicated application programming interface instructions encoded in a computer-readable non-transitory store (vmstore); a plurality of processor cores (cores) coupled to said vmstore; a shared memory store; a video streaming processor coupled by interprocess communication (IPC) to said cores through the shared memory store; a camera control circuit to record parameters for each camera and permissions for video streams requested by obfuscated camera handles (obhandles); a public service agency authentication credential store; and, an agency notification circuit to generate and transmit virtual links to virtual machines and window layouts with obhandles. In an embodiment, obhandles include a transformation of recent timestamps which make reduces the risk of loss or disclosure.

In an embodiment, the method also includes: synthesizing a time-limited obfuscated handle for each shared camera (obhandle); setting streaming permissions for a camera to one of current epoch (live range), past epoch (history range), and both live range and history range; loading into a processor core a virtual machine image and dedicated application programming interface (DAPI) for response to video stream requests from a specific public service agency; synthesizing a virtual link (vlink) and display pane layout populated with at least one obhandle; and notifying by secure messaging a public service agency of activation of the vlink to the DAPI and obhandle display.

Another aspect of the invention is an apparatus to couple and to decouple public service agencies to private video streams.

In an embodiment, the apparatus to couple and decouple public service agencies to private surveillance security video streams under facility administrator control includes a public service agency authentication credential store; an agency notification circuit to generate and transmit virtual links to virtual machines by obfuscated camera handles (obhandles); a camera control circuit to enable video streams requested by said obhandles limited by stored parameters for each camera; and a video stream server (video server).

In an embodiment the apparatus also includes a permissions controller for a plurality of cameras (controller); the controller remotely coupled to a facility administrator console; the controller further coupled to the video stream server, and a public service agency account manager circuit (manager), the manager remotely coupled to at least one browser on a mobile device, and coupled to the video server; a video stream cache and store; a public service agency authentication circuit and credential store; a shared camera permissions circuit to enable streaming metadata and images over a range of time for each shared camera; a circuit to request a geo-identifier from an authenticated public service agency video display; a store of blacklist geo-identifiers; and a circuit to terminate a connection upon matching a blacklist geo-identifier with a geo-identifier received from a mobile wireless video display.

In an embodiment the apparatus also includes a video stream receiver (receiver); the receiver remotely coupled to a plurality of cameras. In an embodiment the apparatus also includes a video stream store (video store) co-located with the video server; the video store coupled to the receiver.

In an embodiment the manager includes: a circuit to validate authentication credentials submitted by said public service agency. In an embodiment the apparatus also includes a circuit to receive commands from a facility administrator to set and store parameters for each camera for video streaming.

In an embodiment the apparatus also includes a circuit to receive commands from a facility administrator to set permission for streaming video recorded and stored prior to agency notification time.

In an embodiment the apparatus also includes a circuit to format a webpage having window frames populated with identifiers of shared cameras; and a circuit to receive at least one request from a remote browser to transmit at least one video image of a shared camera. In an embodiment, the permissions controller includes: stored values of meta data of the camera; and stored values streaming permission for live streaming.

In an embodiment, the video stream server includes: a circuit to receive navigation commands from a browser operated by public service agency user; a circuit to search forward or backward in time of recordation of the video stream; and a circuit to transmit at least one video frame according to navigation commands.

In an embodiment the apparatus also includes a circuit to request a geo-identifier from an authenticated public service agency video display; a store of whitelist geo-identifiers (geo-store); a circuit to enable streaming after matching the geo-store with a geo-identifier received from a mobile wireless video display.

In an embodiment the apparatus also includes a plurality of virtual machine images with dedicated application programming interface instructions encoded in a computer-readable non-transitory store (vmstore); a plurality of processor cores (cores) coupled to said vmstore; a shared memory store; a video streaming processor coupled by interprocess communication (IPC) to said cores through the shared memory store; and a circuit to purge processor cores upon facility administrator selection.

CONCLUSION

The invention can be easily distinguished from conventional video surveillance systems, apparatus, and methods by a facility administrator who has the option to pre-designate public service agencies which can receive immediate real-time security camera access during emergency situations; the cameras are shared only when an administrator activates public service agency access to geo-locations.

The invention can be easily distinguished from conventional video surveillance systems by providing immediate situational awareness which can be crucial when there are intruders, a fire, or other situations. The insights that first responders gain from the clear, deep visibility can directly impact their actions—from necessary evacuations, to the specific protective measures they might take.

The invention can be easily distinguished from conventional video surveillance systems by giving Public Safety Officers the ability to share live video surveillance cameras on smart phones during an emergency.

The invention can be easily distinguished from conventional video surveillance systems by providing a coordinated visibility component into emergency decision making.

The invention can be easily distinguished from conventional video surveillance systems both by equipping local public service agents with critical, real-time insights in the event of an emergency situation—while still retaining full daily privacy.

The invention can be easily distinguished from conventional video surveillance systems by a pre-designated list of public service agencies who will be authorized to view the video during emergencies. They will also authorize specific internal personnel to be capable of activating the emergency video feed.

The invention can be easily distinguished from conventional video surveillance systems by activation only during emergencies. Following set up, the video streams will continue to be private—only accessible by the organization—until authorized personnel activate the video access. Once the emergency video access is enabled, all designated first responders can view video from any major web browser or a secure mobile app.

The invention can be easily distinguished from conventional video surveillance systems by an option to identify specific cameras for the public service agents to view. All designated public service agencies will receive an email which includes direct links to the specified cameras. The invention can be easily distinguished from conventional security systems by a circuit to request a geo-identifier from an authenticated public service agency mobile wireless video display; a store of blacklist geo-identifiers; and a circuit to terminate a connection upon matching a blacklist geo-identifier with a geo-identifier received from a mobile wireless video display. It is understood that wildcards and regular expressions can be used for a blacklist to exclude out of area mobile wireless video displays.

The invention can be easily distinguished from conventional video surveillance systems by force touch activation.

If an authorized person is facing direct danger with insufficient time to launch the application, they can use "force touch" on the application icon on their phone, plus one confirming tap. This will enable first responder access to the cameras.

The invention can be easily distinguished from conventional video surveillance systems by an open RESTful cloud video API to allow the organization's physical security teams to integrate the first responder video emails and access with emergency notification systems they may have in place for first responders The claimed subject matter is easily distinguished from ongoing user permission setting to file access. The claimed subject matter is easily distinguished from unauthorized access to cameras attached directly to a public network at obscure IP addresses. The activation of the video streams begins a collaborative environment among responders, their supervisors, and other public service agencies. The claimed subject matter is easily distinguished from conventional video security systems which generally store images for after the event analysis. Generally, privately owned and installed security assets are not accessible to government agencies except under court order. Privacy and property interests inhibit availability of images on private property.

Having described certain embodiments of methods and systems for distributing access credentials to video streams, it will now become apparent to one of skill in the art that other embodiments incorporating the concepts of the disclosure may be used. Therefore, the disclosure should not be limited to certain embodiments, but rather should be limited only by the spirit and scope of the following claims.

The invention claimed is:

1. An apparatus to couple and decouple public service agencies to private surveillance security video streams under facility administrator control, the apparatus comprising:
   a public service agency authentication credential store;
   an agency notification circuit to generate and transmit virtual links to virtual machines by obfuscated camera handles (obhandles);
   a camera control circuit to enable video streams requested by said obhandles limited by stored parameters for each camera;
   a video stream server (video server);
   a permissions controller for a plurality of cameras (controller); the controller remotely coupled to
   a facility administrator console; the controller further coupled to the video stream server, and
   a public service agency account manager circuit (manager), the manager remotely coupled to
   at least one browser on a mobile device, and coupled to the video server;
   a video stream cache and store;
   a public service agency authentication circuit and credential store;
   a shared camera permissions circuit to enable streaming metadata and images over a range of time for each shared camera;
   a circuit to request a geo-identifier from an authenticated public service agency mobile wireless video display;
   a store of blacklist geo-identifiers; and
   a circuit to terminate a connection upon matching a blacklist geo-identifier with a geo-identifier received from a mobile wireless video display.

2. The apparatus of claim 1 wherein the manager comprises:
   a circuit to validate authentication credentials submitted by said public service agency.

3. The apparatus of claim 1 further comprising:
   a circuit to receive commands from a facility administrator to set and store parameters for each camera for video streaming.

4. The apparatus of claim 1 further comprising:
   a circuit to receive commands from a facility administrator to set permission for streaming video recorded and stored prior to agency notification time.

5. The apparatus of claim 1 further comprising:
   a circuit to format a webpage having window frames populated with identifiers of shared cameras; and
   a circuit to receive at least one request from a remote browser to transmit at least one video image of a shared camera.

6. The apparatus of claim 1 wherein the permissions controller comprises:
   stored values of meta data of the camera; and
   stored values of streaming permission for live streaming.

7. The apparatus of claim 1 wherein the video stream server comprises:
   a circuit to receive navigation commands from a browser operated by public service agency user;
   a circuit to search forward or backward in time of recordation of the video stream; and
   a circuit to transmit at least one video frame according to navigation commands.

8. The apparatus of claim 1 further comprising:
   a circuit to request a geo-identifier from an authenticated public service agency mobile video display;
   a store of whitelist geo-identifiers (geo-store); and,
   a circuit to enable streaming after matching the geo-store with the geo-identifier received from the mobile wireless video display.

9. The apparatus of claim 8 further comprising:
   a plurality of virtual machine images with dedicated application programming interface instructions encoded in a computer-readable non-transitory store (vmstore);
   a plurality of processor cores (cores) coupled to said vmstore;
   a shared memory store;
   a video streaming processor coupled by interprocess communication (IPC) to said cores through the shared memory store; and
   a circuit to purge processor cores upon facility administrator selection.

* * * * *